(12) United States Patent
Kato et al.

(10) Patent No.: US 6,802,202 B2
(45) Date of Patent: Oct. 12, 2004

(54) METHOD FOR ADJUSTING ACCELERATOR PEDAL APPARATUS

(75) Inventors: Yasunari Kato, Toyoake (JP); Masahiro Makino, Kariya (JP)

(73) Assignee: Denso Corporation (JP)

( * ) Notice: Subject to any disclaimer, the term of this patent is extended or adjusted under 35 U.S.C. 154(b) by 8 days.

(21) Appl. No.: 10/199,115

(22) Filed: Jul. 22, 2002

(65) Prior Publication Data

US 2003/0019278 A1 Jan. 30, 2003

(30) Foreign Application Priority Data

Jul. 27, 2001 (JP) ........................................ 2001-227941
Jul. 30, 2001 (JP) ........................................ 2001-230464

(51) Int. Cl.[7] ............................ G01B 7/30; G01B 7/00; F02D 11/02; G12B 13/00; G05G 1/28
(52) U.S. Cl. ........................ 73/1.79; 73/1.75; 74/478; 702/95; 702/104; 324/202
(58) Field of Search ............................ 73/1.75, 1.38, 73/1.41; 74/478; 702/95, 104; 324/202

(56) References Cited

U.S. PATENT DOCUMENTS 5,161,405 A * 11/1992 Macqueene ................. 73/1.79

2003/0188600 A1 * 10/2003 Slanec .......................... 74/514

FOREIGN PATENT DOCUMENTS

| DE | 19939810 A1 | * 2/2001 | ........... B60K/26/02 |
| JP | U-1-157245 | 10/1989 | ........... F02D/11/10 |
| JP | A-9-193687 | 7/1997 | ........... B60K/28/10 |
| JP | A-11-20492 | 1/1999 | ........... B60K/26/02 |
| JP | 2000-320349 | * 11/2000 | ........... F02D/11/02 |

* cited by examiner

Primary Examiner—Thomas P. Noland
(74) Attorney, Agent, or Firm—Nixon & Vanderhye PC

(57) ABSTRACT

An accelerator pedal is positioned at a kickdown position. Then, an output value of a measurement device of an accelerator pedal position sensor is measured. Thereafter, the measured output value of the measurement device is stored in a correction output value storage of the accelerator pedal position sensor along with a corresponding correction value, which is used to correct the measured output value of the measurement device. A couple of fully opened position stop members is provided and is engaged with the accelerator pedal when the accelerator pedal is rotated to a fully opened position. Furthermore, a couple of fully closed position stop members is provided and is engaged with the accelerator pedal when the accelerator pedal is rotated to a fully closed position.

9 Claims, 7 Drawing Sheets

UNIT(DC.V)

|  | FULLY CLOSED | FULLY OPENED | KICKDOWN |
|---|---|---|---|
| MEASURED VALUE | 0.8 | 2.7 | 3.1 |
| CORREC. VALUE | 1.0 | 3.0 | 3.5 |

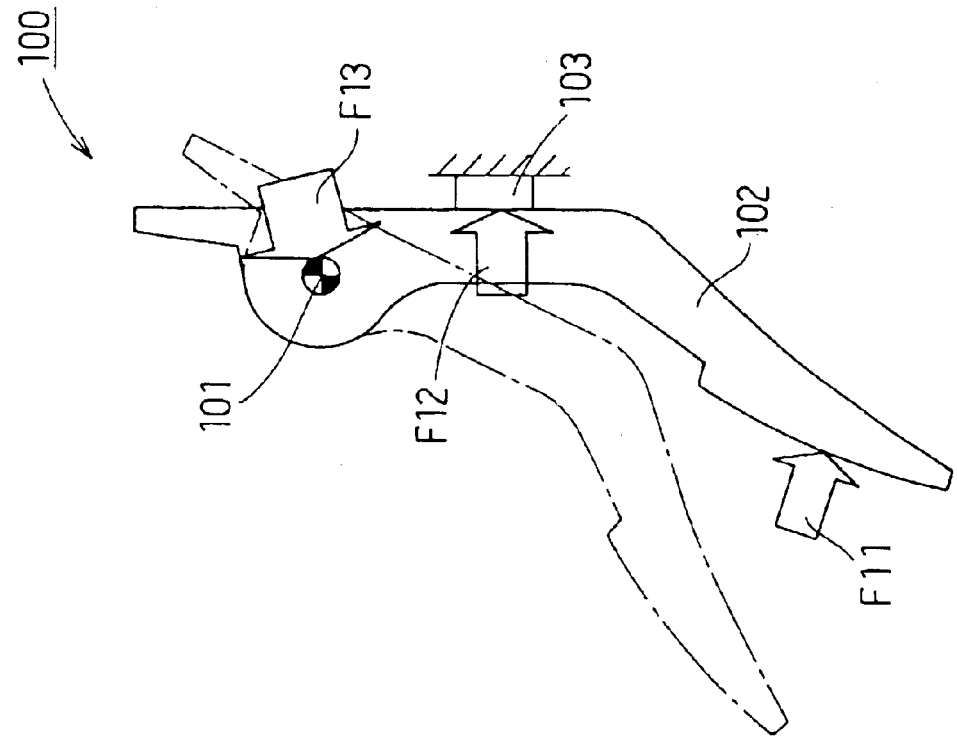
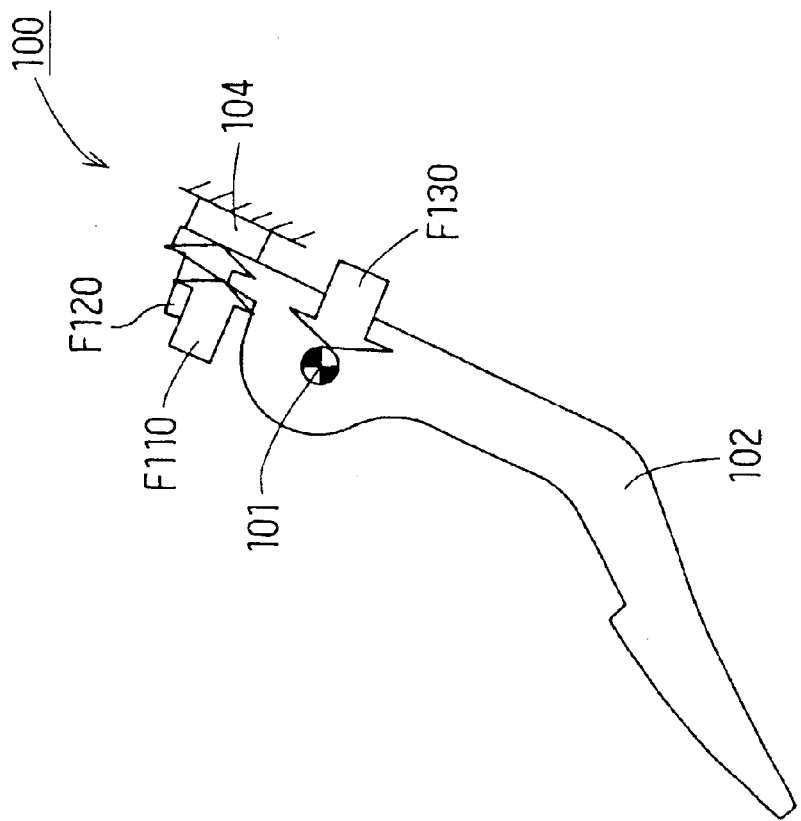

METHOD FOR ADJUSTING ACCELERATOR PEDAL APPARATUS

CROSS REFERENCE TO RELATED APPLICATION

This application is based on and incorporates herein by reference Japanese Patent Application No. 2001-227941 filed on Jul. 27, 2001 and Japanese Patent Application No. 2001-230464 filed on Jul. 30, 2001.

BACKGROUND OF THE INVENTION

1. Field of the Invention

The present invention relates to an accelerator pedal apparatus having an accelerator pedal position sensor for measuring an operational position of an accelerator pedal and also relates to a method for adjusting an output value of the accelerator pedal position sensor.

2. Description of Related Art

Recently, an accelerator pedal apparatus installed in a vehicle often includes an accelerator pedal position sensor, which is operated with an accelerator pedal and measures an operational position of the accelerator pedal. That is, the accelerator pedal position sensor generates an output (electrical signal) that corresponds to the operational position of the accelerator pedal. A throttle side of an engine (power unit), which controls power of the engine, includes a drive device, such as a motor, for driving a throttle valve of the engine. The drive device of the throttle valve is driven based on an output value of the accelerator pedal position sensor. Specifically, preset output values, which correspond to a fully closed position (i.e., operational position of the accelerator pedal before application of pressing force to the accelerator pedal) to a fully closed position (predetermined operational position of the accelerator pedal achieved after moving the accelerator pedal from the fully closed position), are generated from the accelerator pedal position sensor.

However, in the previously proposed accelerator pedal apparatus, it sometimes happens that the operational position of the accelerator pedal is deviated from the output value of the accelerator pedal position sensor due to a variation in attachment of the accelerator pedal position sensor relative to the accelerator pedal. That is, when the accelerator pedal is positioned to a predetermined operational position (such as the fully opened position or the fully closed position), the accelerator pedal position sensor does not output a preset output value assigned to the predetermined operational position.

Furthermore, the operational positions of the accelerator pedal can include an operational position located outside a normally used operational range between the fully closed position and the fully opened position. One example of such an operational position located outside the normally used operational range is known as a kickdown position. The accelerator pedal is pressed from the fully closed position to the fully opened position and is then further pressed to the kickdown position. The accelerator pedal is position to the kickdown position when the power of the engine needs to be increased from the power achieved at the fully opened position of the accelerator pedal. Specifically, when the accelerator pedal position sensor outputs an output value indicating the kickdown position, a gear ratio of a transmission is changed to increase the power of the engine.

Thus, a pedal pressing force control means is provided to allow the operator to note that the accelerator pedal is reached the kickdown position by providing a notable change, which can be noted by the operator, in the pedal pressing force when the accelerator pedal reaches the kickdown position. A preset output value, which corresponds to the notable change in the pedal pressing force, is outputted from the accelerator pedal position sensor. However, due to a fact that the pedal pressing force control means is provided separately from the accelerator pedal, the notable change in the pedal pressing force sometimes deviates from the preset output value that should be outputted from the accelerator pedal position sensor when the pedal pressing force control means generates the notable change in the pedal pressing force. This illustrates the difficulty of outputting the preset output value, which corresponds to the predetermined operational position of the accelerator pedal.

Even in the case where the accelerator pedal position sensor detects one of the fully closed position, the fully opened position and the kickdown position as the predetermined operational position of the accelerator pedal, when a notable change in the pedal pressing force made at the predetermined operational position does not match with sensor information (signal), which indicates the predetermined operational position, the operator cannot properly notice that the accelerator pedal is placed at the predetermined operational position, resulting in a mismatch between the notification of the operator and the output of the engine, which is driven based on the sensor information.

Apart from the above disadvantage, FIGS. 8A and 8B show a previously proposed accelerator pedal apparatus 100. The accelerator pedal apparatus 100 includes an accelerator pedal 102, which is rotated about a rotational shaft 101 by pedal pressing force applied to the accelerator pedal 102. The accelerator pedal apparatus 100 also includes a fully opened position stop member 103. For example, with reference to FIG. 8B, when the accelerator pedal 102 is pressed, a pressing force (F11 in FIG. 8B) is applied to one end of the accelerator pedal 102, so that the accelerator pedal 102 is positioned to a fully opened position. When the accelerator pedal 102 reaches the fully opened position, the fully opened position stop member 103 engages with a corresponding portion of the accelerator pedal 102 and thus prevents further rotation of the accelerator pedal 102. In the previously proposed accelerator apparatus 100, the fully opened position stop member 103 is provided only at one position. The accelerator pedal apparatus 100 also includes a fully closed position stop member 104. With reference to FIG. 8A, when the pressing force F11 applied to the one end of the accelerator pedal 102 is released, a return force (F110 in FIG. 8A) is applied to the accelerator pedal 102 to return the accelerator pedal 102 to the fully closed position. Similar to the fully opened position stop member 103, when the accelerator pedal 102 reaches the fully closed position, the fully closed position stop member 104 engages with a corresponding portion of the accelerator pedal 102 and thus prevents further rotation of the accelerator pedal 102. The fully closed position stop member 103 is provided only at one position.

In the case where the fully opened position stop member 103 is provided only at the one position like in the previously proposed accelerator pedal apparatus 100, when the accelerator pedal 102 is rotated to the fully opened position to cause the engagement of the corresponding portion of the accelerator pedal 102 with the fully opened position stop member 103, a load F12 is applied to the fully opened position stop member 103, as shown in FIG. 8B. Then, a portion of the fully opened position stop member 103, which is engaged with the accelerator pedal 102, acts as a fulcrum point. Thus, when the accelerator pedal 102 is further rotated about the rotational shaft 101, the accelerator pedal 102 is pivoted on the portion of the fully opened position stop member 103 acting as the fulcrum point, and thus a relatively large load F13 is applied to the rotational shaft 101 in a direction opposite to that of the load F12. That is, the load F13 applied to the rotational shaft 101 is proportional to the pressing force F11 of the operator. Thus, when the operator applies the larger amount of pressing force to the accelerator pedal 102, the larger amount of the load F13 is applied to the rotational shaft 101. Also, in the case of releasing the accelerator pedal 102, when the operator abruptly releases the accelerator pedal 102, the accelerator pedal 102 abruptly hits the fully closed position stop member 104 to generate a load F120. Thus, a relatively large load F130 is applied to a rotational shaft 101 in a direction opposite to that of the load F120. When the rotational shaft 101 cannot withstand the relatively large loads F13, F130, the rotational shaft 101 will be deformed, restraining smooth rotation of the rotational shaft 101.

SUMMARY OF THE INVENTION

The present invention addresses the above disadvantages. Thus, it is an objective of the present invention to provide an accelerator pedal apparatus, which includes an accelerator pedal and an accelerator pedal position sensor and is capable of outputting a preset output value indicating a predetermined position of the accelerator pedal even when an attachment position of the accelerator pedal position sensor relative to the accelerator pedal is deviated from its initial position. Another objective of the present invention is to provide a method for adjusting the output value of such an accelerator pedal apparatus. It is a further objective of the present invention to provide an accelerator pedal apparatus capable of reducing a load applied to a rotational shaft of an accelerator pedal when a load is applied to the accelerator pedal.

To achieve the objectives of the present invention, there is provided a method for adjusting an output value of an accelerator pedal position sensor. According to the method, an accelerator pedal is first positioned at a predetermined operational position, which is located between an application initiation position, at which application of resistive force from a resilient engaging member to the accelerator pedal is initiated, and an application end position, at which the resistive force from the resilient engaging member is substantially removed from the accelerator pedal. Then, an output value of a measurement device of the accelerator pedal position sensor is measured while the accelerator pedal is positioned at the predetermined operational position to obtain the measured output value indicating the predetermined operational position of the accelerator pedal. Thereafter, the measured output value of the measurement device of the accelerator pedal position sensor measured at the predetermined operational position of the accelerator pedal is stored in a correction output value storage of the accelerator pedal position sensor along with a corresponding correction value, which is used to correct the measured output value of the measurement device of the accelerator pedal position sensor to obtain a corresponding preset output value of the accelerator pedal position sensor that is preassigned to the predetermined operational position of the accelerator pedal. Next, the corresponding preset output value of the accelerator pedal position sensor, which is preassigned to the predetermined operational position of the accelerator pedal, is outputted from the accelerator pedal position sensor based on the corresponding correction value stored in the correction output value storage when the measurement device of the accelerator pedal position sensor outputs the corresponding measured output value associated with the correction value of the accelerator pedal position sensor.

To achieve the objectives of the present invention, there is provided an accelerator pedal apparatus including a support member, an accelerator pedal rotatably supported by the support member, and an accelerator pedal position sensor for measuring an operational position of the accelerator pedal. The accelerator pedal apparatus further includes a resilient engaging member, which is opposed to the accelerator pedal and is secured to the support member. The resilient engaging member is engaged with the accelerator pedal when the accelerator pedal is pressed to a prespecified point. The resilient engaging member is deformed to allow further movement of the accelerator pedal and exerts resistive force against the accelerator pedal when the accelerator pedal is further pressed beyond the prespecified point. The resistive force of the resilient engaging member exerted against the accelerator pedal is released when an amount of deformation of the resilient engaging member reaches a predetermined amount.

To achieve the objectives of the present invention, there is provided an accelerator pedal apparatus including a rotatable shaft and an accelerator pedal, which is rotatable about the rotational shaft. The accelerator pedal further includes two or more fully opened position stop members, which are engaged with the accelerator pedal when the accelerator pedal is rotated to a fully opened position by pedal pressing force applied to the accelerator pedal, so that further rotation of the accelerator pedal is restrained by the fully opened position stop members. At least one of the fully opened position stop members is arranged on a first side of the rotational shaft, and at least another one of the fully opened position stop members is arranged on a second side of the rotational shaft, which is opposite to the first side.

In addition to or alternative to the fully opened position stop members, the accelerator pedal apparatus may includes two or more fully closed position stop members, which are engaged with the accelerator pedal when the accelerator pedal is rotated to a fully closed position by removing pedal pressing force from the accelerator pedal, so that further rotation of the accelerator pedal is restrained by the fully closed position stop members. At least one of the fully closed position stop members is arranged on a first side of the rotational shaft, and at least another one of the fully closed position stop members is arranged on a second side of the rotational shaft, which is opposite to the first side.

BRIEF DESCRIPTION OF THE DRAWINGS

The invention, together with additional objectives, features and advantages thereof, will be best understood from the following description, the appended claims and the accompanying drawings in which:

FIG. 8A is a schematic view showing a fully closed position of an accelerator pedal of a previously proposed accelerator pedal apparatus; and FIG. 8B is a schematic view showing a fully opened position of the accelerator pedal of the previously proposed accelerator pedal apparatus.

DETAILED DESCRIPTION OF THE INVENTION

Various embodiment of the present invention will be described with reference to the accompanying drawings.
(First Embodiment)

An accelerator pedal apparatus and a method for adjusting an output value of the same according to a first embodiment of the present invention will be described with reference to the accompanying drawings.

Figure 1A:
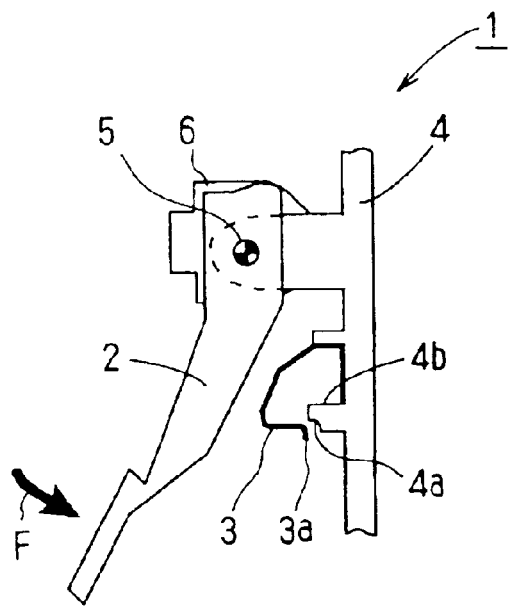
FIG. 1A is a schematic side views showing an accelerator pedal of a first embodiment of the present invention positioned at a fully closed position.
Figure 1B:
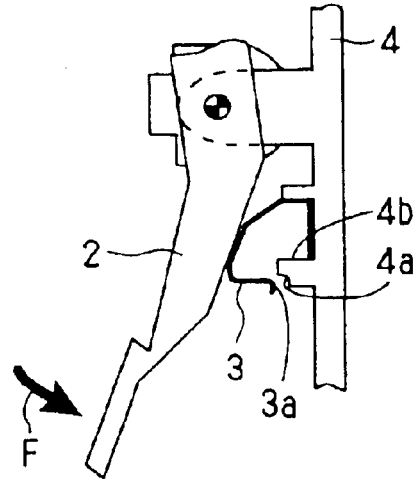
FIG. 1B is another schematic view similar to FIG. 1A showing the accelerator pedal of the first embodiment positioned at an engagement initiating position.
Figure 1C:
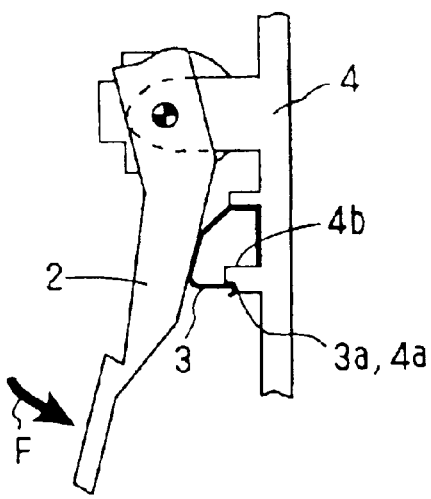
FIG. 1C is another schematic view similar to FIGS. 1A and 1B showing the accelerator pedal of the first embodiment positioned at a fully opened position.
Figure 1D:
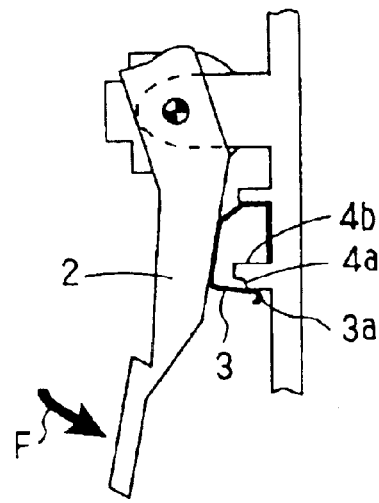
FIG. 1D is another schematic view similar to FIGS. 1A–1C showing the accelerator pedal of the first embodiment positioned at a kickdown position.
Figure 2:
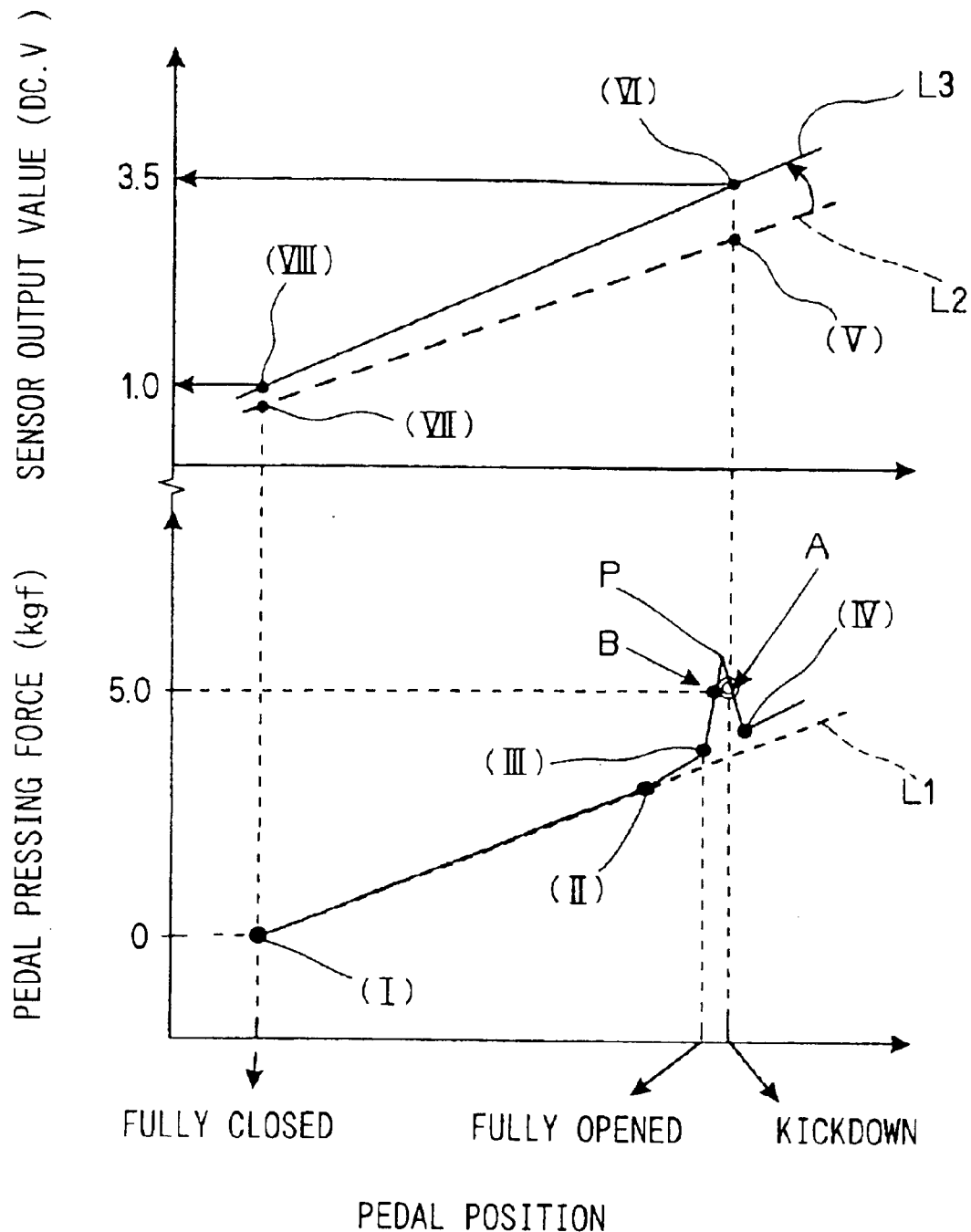
FIG. 2 is a graph showing a pedal pressing force applied to the accelerator pedal of the first embodiment and an output value of an accelerator pedal position sensor of the first embodiment with reference to an operational position of the accelerator pedal.

FIGS. 1A–1D show a process of pressing an accelerator pedal 2 of the accelerator pedal apparatus 1 together with various operational positions of the accelerator pedal 2. Specifically, FIG. 1A shows a fully closed position of the accelerator pedal 2 of the accelerator pedal apparatus 1. FIG. 1B shows an engagement initiating position of the accelerator pedal 2, at which the accelerator pedal 2 initiates engagement with a resilient engaging member 3 of the accelerator pedal apparatus 1. FIG. 1C shows a fully opened position of the accelerator pedal 2, at which the accelerator pedal 2 is further pressed from the state shown in FIG. 1B. FIG. 1D shows a kickdown position, at which the accelerator pedal 2 is further pressed from the state shown in FIG. 1C, and thus additional resistive force of the engaging member 3 applied to the accelerator pedal 2 is released. FIG. 2 is a graph showing an accelerator pedal pressing force (kgf) and an accelerator pedal position sensor output value (DC. voltage) against an accelerator pedal position.

In the accelerator pedal apparatus 1 according to the present embodiment, an operation range of the accelerator pedal 2 includes the kickdown position in addition to a normal pedal operation range, which is between the fully closed position and the fully open position. The accelerator pedal 2 is pressed from the fully closed position to the fully opened position and is further pressed to the kickdown position. The accelerator pedal 2 is pressed to the kickdown position when a power of an engine (not shown) needs to be increased beyond a predetermined engine power that is achieved at the fully opened position (full throttle position) of the accelerator pedal 2. Specifically, for example, when the accelerator pedal 2 is pressed to the kickdown position, an output value, which indicates that the accelerator pedal 2 is pressed to the kickdown position, is outputted form an accelerator pedal position sensor 6. Thus, a gear ratio of a transmission is changed to increase the power of the engine. The kickdown position of the accelerator pedal 2 is not normally reached. The kickdown position is reached when the accelerator pedal 2 is pressed to activate the resilient engaging member 3, which is also referred to as a pedal pressing force control means (described later), to generate a notable change in the pedal pressing force applied to the accelerator pedal 2 from an operator. With this change in the pedal pressing force, the operator can notice that the accelerator pedal has reached the kickdown position.

A point I in FIG. 2 corresponds to the fully closed position of the accelerator pedal 2 shown in FIG. 1A. The accelerator pedal 2 is rotatable about a support shaft (rotational shaft) 5 that is supported by a support member 4. The resilient engaging member 3 made, for example, of a deformable leaf spring is secured to the support member 4. The leaf spring is made of a metal or resin material. The accelerator pedal position sensor 6 is secured to the support member 4 near the support shaft 5. The accelerator pedal position sensor 6 generates the output values (electrical signals) corresponding to the operational positions of the accelerator pedal 2.

A return spring (not shown) is also provided as a return force generator in the accelerator pedal apparatus 1. The return spring urges the accelerator pedal 2 to the fully closed position or an initial position, so that the accelerator pedal 2 is returned to the fully closed position when the pedal pressing force is removed from the accelerator pedal 2. That is, when the accelerator pedal 2 is pressed in a direction of F in FIG. 1A, the pedal pressing force is applied to the accelerator pedal 2 to maintain the accelerator pedal 2 at a desired position. A line L1 in FIG. 2 shows characteristic relationship between the pedal position and the pedal pressing force of the accelerator pedal 2 influenced by the return force generator.

FIG. 1B shows a state where the accelerator pedal 2 is pressed such that the accelerator pedal 2 initiates engagement with the engaging member 3. This state corresponds to an intermediate accelerator pedal position or a position (application initiation position) II in FIG. 2. At this point II, the engaging member 3 initiates application of an additional resistive force on the accelerator pedal 2, so that the accelerator pedal 2 receives the additional resistive force against the pedal pressing force in addition to the force applied from the return force generator.

FIG. 1C shows a state where the accelerator pedal 2 has been further pressed from the state shown in FIG. 1B, so that the engaging member 3 is deformed to allow a relatively small additional movement (or additional stroke) of the accelerator pedal 2 while the engaging member 3 is engaged with the accelerator pedal 2, and a free end 3a of the engaging member 3 is engaged with a stepped portion 4a arranged at a distal end of a projection 4b of the support member 4. This engaged state of the free end 3a of the engaging member 3 with the stepped portion 4a of the support member 4 corresponds to a point III in FIG. 2. Although the point III in FIG. 2 is located before the end of an effective stroke range of the accelerator pedal 2, the point III is a point where a command for positioning a throttle valve at a full throttle position (100% opened) is issued.

FIG. 1D shows a state where the accelerator pedal 2 has been further pressed from the state shown in FIG. 1C, so that the engaging member 3 has been further deformed to increase the additional resistive force while the free end 3a of the engaging member 3 has been engaged with the stepped portion 4a of the support member 4, and then the engagement between the free end 3a of the engaging member 3 and the stepped portion 4a of the support member 4 has been released when an amount of the deformation of the engaging member 3 has reached a predetermined amount. Specifically, the free end 3a is released from the stepped portion 4a, and thereby the additional resistive force applied to the accelerator pedal 2 is removed from the accelerator pedal 2. A point (peak position) P in FIG. 2 shows a peak point (maximum point) of the additional resistive force applied to the accelerator pedal 2 from the engaging member 3. A point (application end position) IV in FIG. 2 corresponds to a state where the additional resistive force applied to the accelerator pedal 2 from the engaging member 3 is released. Thus, the engaging member 3 can achieve the characteristic pedal pressing forces at the points III, P, IV in FIG. 2 and thus acts as a pedal pressing force control means.

The engaging member 3 is a mechanism that generates the additional resistive force when it is engaged with and is urged by the accelerator pedal 2, and thus the engaging member 3 does not generate resistance against the return force applied to the accelerator pedal 2. As a result, the engaging member 3 can act as the pedal pressing force control means that assures smooth movement of the accelerator pedal 2 on both the pressing and returning of the accelerator pedal 2.

The kickdown position described above is located between the point P and the point IV in FIG. 2. That is, when the operator presses the accelerator pedal 2, and thus the accelerator pedal 2 is placed in a range between the point III and the point IV in FIG. 2 to generate the additional resistive force, the operator can recognize the generation of the additional resistive force applied to the accelerator pedal 2. When the operator recognizes the additional resistive force, the operator can notice a change in the operational state of the accelerator pedal 2. Furthermore, the kickdown position is provided right after the point P (the kickdown position is located at a point A in FIG. 2). An output value (electrical signal), which indicates the kickdown position at the point A in FIG. 2, is outputted, for example, to a power control device (not shown) of the engine to increase the power of the engine. That is, the notable change in the operational state of the accelerator pedal 2 is provided to correspond with a point where the power of the engine is changed or shifted to the higher power, so that the operator can understand the operational state of the accelerator pedal 2 in connection with the power of the engine.

Due to variations in attachment of the accelerator pedal position sensor 6 to the accelerator pedal 2, variations in relative position between the accelerator pedal 2 and the engaging member 3 and/or the like, the actual kickdown position often does not match the output value of the accelerator pedal position sensor 6, which indicates the kickdown position (predetermined operational position). That is, the accelerator pedal position sensor 6 does not output a preset output value at the predetermined kickdown position. A line L2 in FIG. 2 shows characteristics of the output values of the accelerator pedal position sensor 6 for the various pedal positions of the accelerator pedal 2 and also shows a deviation of the output value of the accelerator pedal position sensor 6 at the kickdown position. To address this disadvantage, there is provided an electric circuit means for adjusting the output value of the accelerator pedal position sensor 6 to the preset output value that is assigned to the predetermined pedal position. That is, with use of an output adjusting means (described below) 10, the line L2 is adjusted to a line L3 in FIG. 2 such that the notable change in the operational state of the accelerator pedal 2 matches the point where the power of the engine is changed to the higher power.

Figures 3, 4:
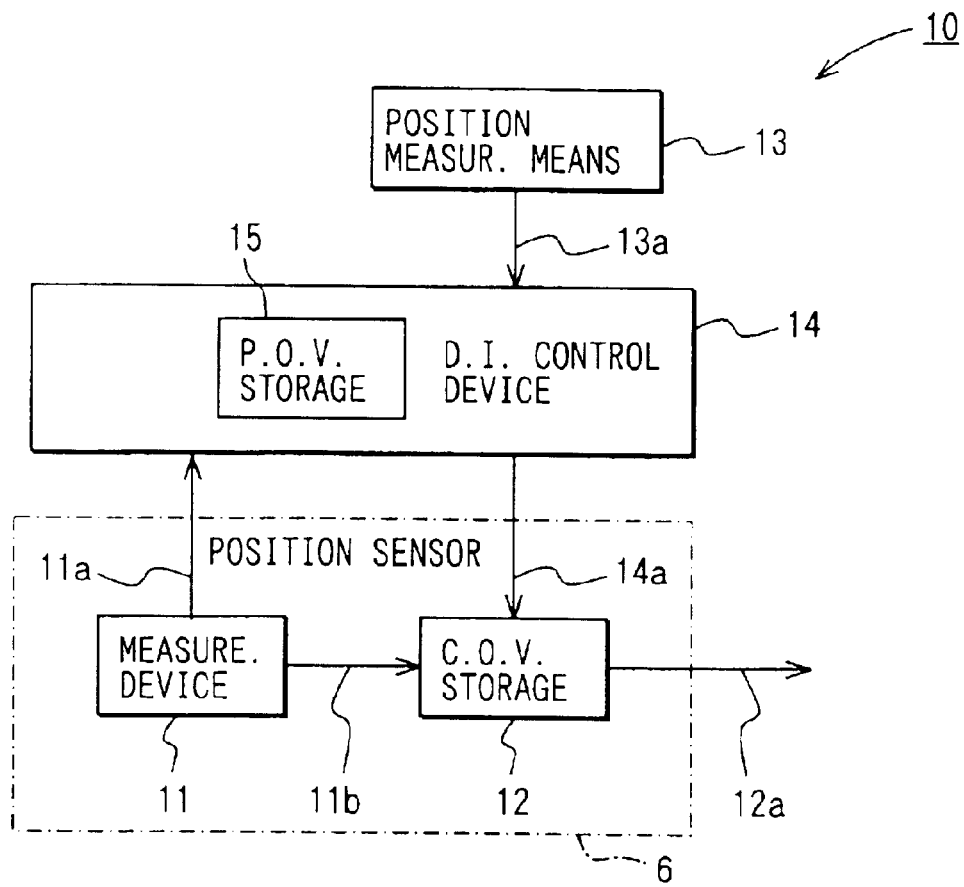
FIG. 3 is a block diagram showing an output adjusting means and the accelerator pedal position sensor of the first embodiment.
FIG. 4 is a table showing data stored in a correction output value storage of the first embodiment.

FIG. 3 is a block diagram showing the output adjusting means 10 and the accelerator pedal position sensor 6. The output adjusting means 10 adjusts an apparent output of the accelerator pedal position sensor 6 when it is connected to the accelerator pedal position sensor 6 to electrically correct output values of the accelerator pedal position sensor 6 after the accelerator pedal position sensor 6 is mounted to the accelerator pedal 2. The output adjusting means 10 includes a pedal position measuring means 13 and a data input control device 14. The pedal position measuring means 13 and the data input control device 14 act as the external devices. The adjustment of the output of the accelerator pedal sensor 6 can be performed, for example, before shipment of the accelerator pedal apparatus or during inspection of the vehicle after the shipment. As shown in FIG. 3, the accelerator pedal position sensor 6 includes a measurement device (output device) 11 and a correction output value storage (e.g., memory) 12. The measurement device 11 generates output values that correspond to positions of the accelerator pedal 2. The output values of the measurement device 11 include at least an output value corresponding to the fully closed position of the accelerator pedal 2, an output value corresponding to the fully opened position of the accelerator pedal 2 and an output value corresponding to the kickdown position of the accelerator pedal 2. The measurement device 11 has a non-contacting measurement mechanism that measures the positions of the accelerator pedal 2 without contacting a moving part of the accelerator pedal 2 and changes its output when the operational position of the accelerator pedal 2 is changed, for example, by the operator who presses the accelerator pedal 2.

The measurement device 11 can be modified to allow measurement of continuous operational positions of the accelerator pedal 2, which include not only the fully closed position, the fully opened position and the kickdown position of the accelerator pedal 2 but also other operational positions of the accelerator pedal, so that a linear output can be generated from the measurement device 11. In the present embodiment, a Hall element type measurement mechanism (measurement mechanism including a Hall element) is used as the non-contacting measurement mechanism. In the Hall element type measurement mechanism, a magnet is mounted to a moving part, which is moved integrally with the accelerator pedal 2, and a Hall element is mounted to a stable part, which does not move integrally with the accelerator pedal 2. The non-contacting measurement mechanism (Hall element type measurement mechanism) can provide a stable output from the measurement device 11 even when the measurement device 11 is placed in the severe environment where the accelerator pedal 2 is pressed and released frequently with generation of relatively large shocks. Besides the Hall element type measurement mechanism, a magnetoresistive element type measurement mechanism (measurement mechanism including a magnetoresistive element) or a differential transformer type measurement mechanism (measurement mechanism including a differential transformer) can be used as the non-contacting measurement mechanism. These non-contacting measurement mechanisms can achieve a linearity of output values for the corresponding positions of the accelerator pedal 2 and can be provided in a relatively compact form, allowing a reduction in the size of the accelerator pedal position sensor 6.

The correction output value storage 12 stores the measured output values of the measurement device 11 measured at the fully closed position, the fully opened position and the kickdown position of the accelerator pedal 2 and also stores corresponding correction values. Each correction value is used to correct the measured output value of the measurement device 11 to obtain a corresponding preset output value of the accelerator pedal position sensor 6 that is preassigned to the corresponding predetermined operational position of the accelerator pedal 2. In this embodiment, the corresponding preset output value of the accelerator pedal position sensor 6 itself is used as the correction value. Each correction value is retrieved from a preset output value storage (e.g., memory) 15 (described later). The process of storing the output values of the measurement device 11 and the corresponding correction values (preset output values) in the correction output value storage 12 is performed on the accelerator pedal apparatus 1, in which the accelerator pedal position sensor 6 and the engaging member 3 are installed, before the shipment of the accelerator pedal apparatus 1 by connecting the pedal position measuring means 13 and the data input control device 14 to the accelerator pedal apparatus 1. Also, for example, when an attachment position of the accelerator pedal position sensor 6 of the accelerator pedal apparatus 1 is deviated from the original attachment position after the shipment of the accelerator pedal apparatus 1, the relationship between each output value of the measurement device 11 and the corresponding preset output value (correction value) stored in the correction output value storage 12 can be readjusted.

The pedal position measuring means 13 is operated in conjunction with the accelerator pedal 2. The pedal position measuring means 13 has an angular position measuring capability for measuring continuous operational angular positions of the accelerator pedal 2 during the pressing operation of the accelerator pedal 2 starting from the fully closed position. The pedal position measuring means 13 also has a pedal pressing force measuring capability for measuring the pedal pressing force applied to the accelerator pedal 2. Data 13a, which indicates the angular position of the accelerator pedal 2 and the pressing force applied to the accelerator pedal 2, is outputted from the pedal position measuring means 13 to the data input control device 14. That is, the data 13a transmitted from the pedal position measuring means 13 allows determination of the operational position of the accelerator pedal 2. For example, when the kickdown position (point A in FIG. 2) of the accelerator pedal 2 needs to be determined, the pressing force measured by the pedal position measuring means 13 can be used. In this case, the accelerator pedal 2 is first positioned to a point (reference position) B, which is located between the point (application initiation position) II and the point (peak position) P in FIG. 2. Positioning of the accelerator pedal 2 to the point B can be accomplished by pressing the accelerator pedal 2 with the pedal position measuring means 13 to the point B while the pressing force applied to the accelerator pedal 2 is measured with the pedal position measuring means 13. In this embodiment, when the pressing force applied to the accelerator pedal 2 reaches 5.0 kgf, it is determined that the accelerator pedal 2 is positioned to the position B. Then, the accelerator pedal 2 is further pressed from the position B by a predetermined angular distance, which is computed based on previously prepared design data, with the aid of the angular position measuring capability of the pedal position measuring means 13. Thus, the accelerator pedal 2 is positioned to the position A.

The data input control device 14 includes the preset output value storage 15 for storing each preset output value (correction value) that corresponds to the corresponding predetermined operational position of the accelerator pedal 2. That is, the data input control device 14 can determine the predetermined operational position of the accelerator pedal 2 based on the angular position data of the accelerator pedal 2 and the pressing force applied to the accelerator pedal 2, which are all received from the pedal position measuring means 13. Thus, when the accelerator pedal 2 is pressed and is positioned to the predetermined operational position, the preset output value (correction value) of the predetermined operational position of the accelerator pedal 2 stored in the preset output value storage 15 is retrieved and is outputted to the correction output value storage 12 along with the output value 11a of the measurement device 11 measured at the predetermined operational position of the accelerator pedal 2. In the correction output value storage 12, the preset output value (correction value) retrieved from the preset output value storage 15 and the output value 11a of the measurement device 11 are stored as a pair. The correction output value storage 12 can store more than one preset output value (correction value) and the corresponding output value 11a of the measurement device 11.

When the accelerator pedal 2 is positioned to the predetermined operational position, the accelerator pedal position sensor 6, which has the correction output value storage 12, obtains the preset output value 12a (VI in FIG. 2) stored in the correction output value storage 12 based on the output value 11b (V in FIG. 2), which has been outputted from the measurement device 11 to the correction output value storage 12 when the accelerator pedal 2 was positioned to the predetermined operational position. Then, the accelerator pedal position sensor 6 outputs the preset output value 12a.

FIG. 4 shows exemplary data stored in the correction output value storage 12. When the output value (unmodified output value of the accelerator pedal position sensor) 11b at the kickdown position is 3.1 DC.V, the accelerator pedal position sensor outputs 3.5 DC.V as the preset output value 12a.

As described above, the accelerator pedal apparatus 1, which has the correction output value storage 12, can output the preset output value when the accelerator pedal 2 is positioned to the predetermined operational position. With this arrangement, when the preset output value is outputted from the accelerator pedal position sensor 6 at the kickdown position, a gear ratio of the transmission is shifted. Thus, the recognition of the change in the operational state of the accelerator pedal 2 by the operator can be advantageously matched with the change in the engine operational sate (engine power).

When the accelerator pedal position sensor 6 is constructed to measure the continuous operational positions of the accelerator pedal 2, which include not only the fully closed position and the kickdown position of the accelerator pedal 2 but also the fully opened position and other operational positions between the fully closed position and the fully opened position of the accelerator pedal 2, the output values of the measurement device 11, which correspond to the operational positions, and the corresponding preset output values (correction values) can be stored in the correction output value storage 12. Furthermore, in place of each preset output value stored in the preset output value storage 15 and/or the correction output value storage 12, only a difference between each preset output value and a corresponding output value of the measurement device 11 can be stored in the preset output value storage 15 and/or the correction output value storage 12 as the correction value. Furthermore, the correction value stored in the preset output value storage 15 and/or the correction output value storage 12 can be a preset coefficient value (e.g., gain), from which the corresponding preset output value of the accelerator pedal position sensor 6 is obtainable by applying the corresponding preset coefficient value to the measured output value of the measurement device 11 of the accelerator pedal position sensor 6.

Figure 5:
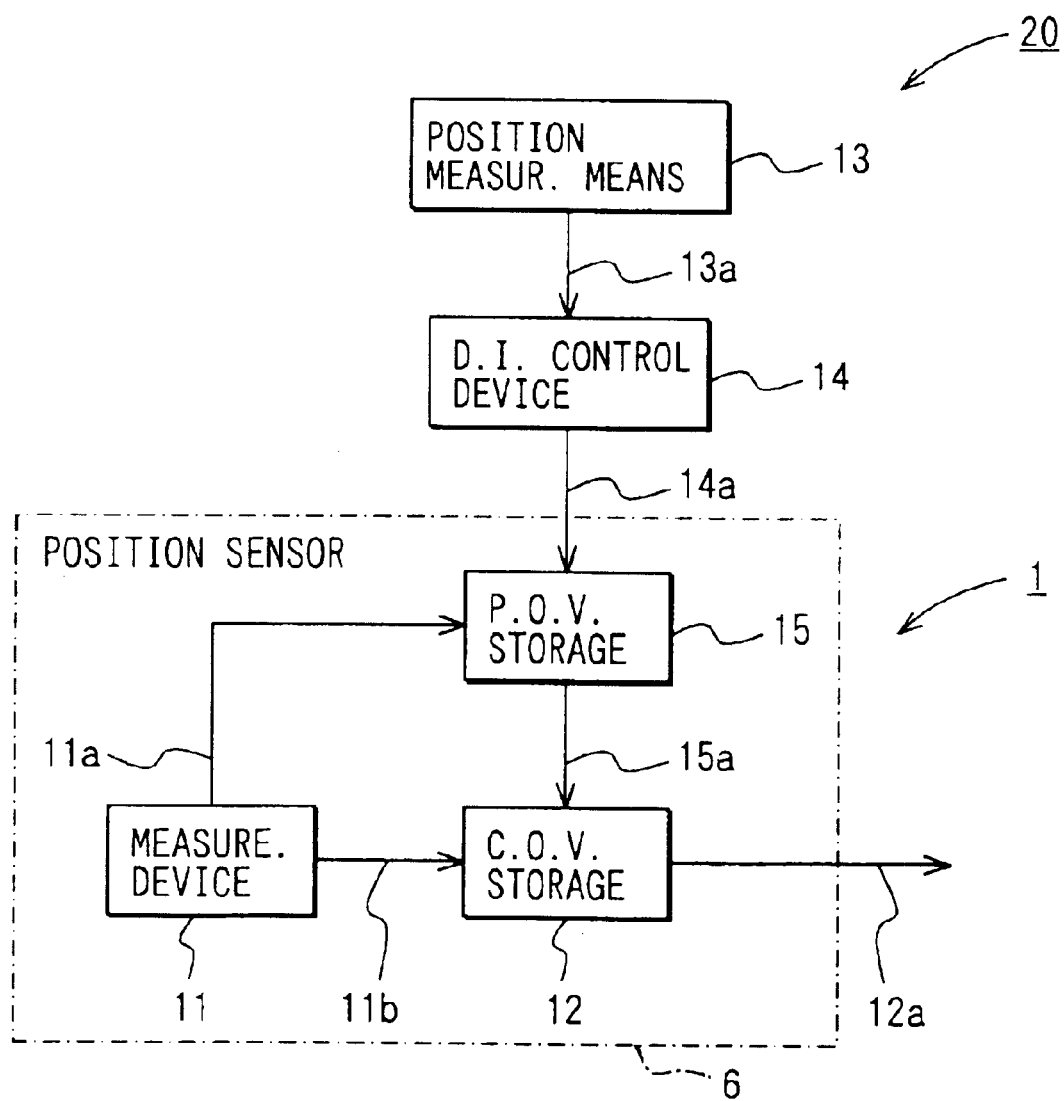
FIG. 5 is a block diagram showing a modification of the output adjusting means and the accelerator pedal position sensor of the first embodiment.

A modification of the above embodiment will be described with reference to FIG. 5. In the following description, similar components to those described above are similarly labeled. The output adjusting means 10 of FIG. 3 is replaced with an output adjusting means 20 in FIG. 5. The output adjusting means 20 includes the preset output value storage 15 integrated into the accelerator pedal position sensor 6. Specifically, the preset output value storage 15, which stores the preset output value (correction value) assigned to the predetermined operational position of the accelerator pedal 2, is placed in the accelerator pedal position sensor 6. The data input control device 14, which corrects the information for obtaining the preset output value (correction value) to be stored in the correction output value storage 12 through the preset output value storage 15, is connected to the accelerator pedal position sensor 6. The data input control device 14 pairs the output value of the measurement device 11, which is outputted at the predetermined operational position of the accelerator pedal 12, with the corresponding preset output value (correction value) stored in the preset output value storage 15. Then, the data input control device 14 outputs the paired data (i.e., the output value of the measurement device 11 and the corresponding preset output value stored in the storage 15) from the preset output value storage 15 to the correction output value storage 12 and commands the correction output value storage 12 to store the paired data. The relationship between the data input control device 14 and the pedal position measuring means 13 is the same as that of the above embodiment.

That is, the data input control device 14 of the output adjusting means 20 pairs the preset output value (correction value) corresponding to the predetermined operational position of the accelerator pedal 2 with the output value 11a of the measurement device 11 at the predetermined operational position of the accelerator pedal 2. Then, the data input control device 14 outputs the paired data 15a to the correction output value storage 12 and also outputs a command signal 14a to command the correction output value storage 12 to store the paired data 15a.

With the output adjusting means 20, the preset output value (correction value), which is assigned to the predetermined position of the accelerator pedal 2 stored in the preset output value storage 15, can be adjusted according to a specification that corresponds to each corresponding vehicle model. With such a modification, the data stored in the preset output value storage 15 will not be misused, so that it is possible to correctly and quickly store the output value of the measurement device 11 and the corresponding preset output value (correction value) stored in the preset output value storage 15.

Besides the kickdown position (point A in FIG. 2) of the accelerator pedal 2, the predetermined operational position of the accelerator pedal 2 can be, for example, the fully closed position (i.e., the position where no force is applied to the accelerator pedal 2 to press the same). When a preset output value, which indicates the fully closed position of the accelerator pedal 2, is outputted from the accelerator pedal position sensor 6 to the engine side, the engine can be operated with higher accuracy at a predetermined idling speed. Furthermore, since the idling speed is matched with the fully closed position of the accelerator pedal 2, a change in the operational position of the accelerator pedal 2 corresponds with an increase in the power of the engine without deviation, so that a delay in the change of the power of the engine can be avoided. That is, the predetermined operational position of the accelerator pedal 2 can be set to any one of the operational positions, such as the fully opened position, and can be matched exactly with the power generating side of the engine. FIG. 4 shows the exemplary data stored in the correction output value storage 12. When the output value (unmodified output value of the accelerator pedal position sensor or the measurement device 11 of the accelerator pedal position sensor) 11b at the fully closed position is 0.8 DC. V, the accelerator pedal position sensor outputs 1.0 DC. V as the preset output value 12a. The output values 11b, 12a are indicated at points VII, VIII, respectively, in FIG. 2.

In the above embodiment, the engaging member 3 is formed of the resiliently deformable leaf spring. The shape and structure of the engaging member 3 need not be one described above and can be modified any one capable of allowing notification of the change in the operational state of the accelerator pedal 2.

(Second Embodiment)

A second embodiment of the present invention will be described with reference to the accompanying drawings.

Figure 6:
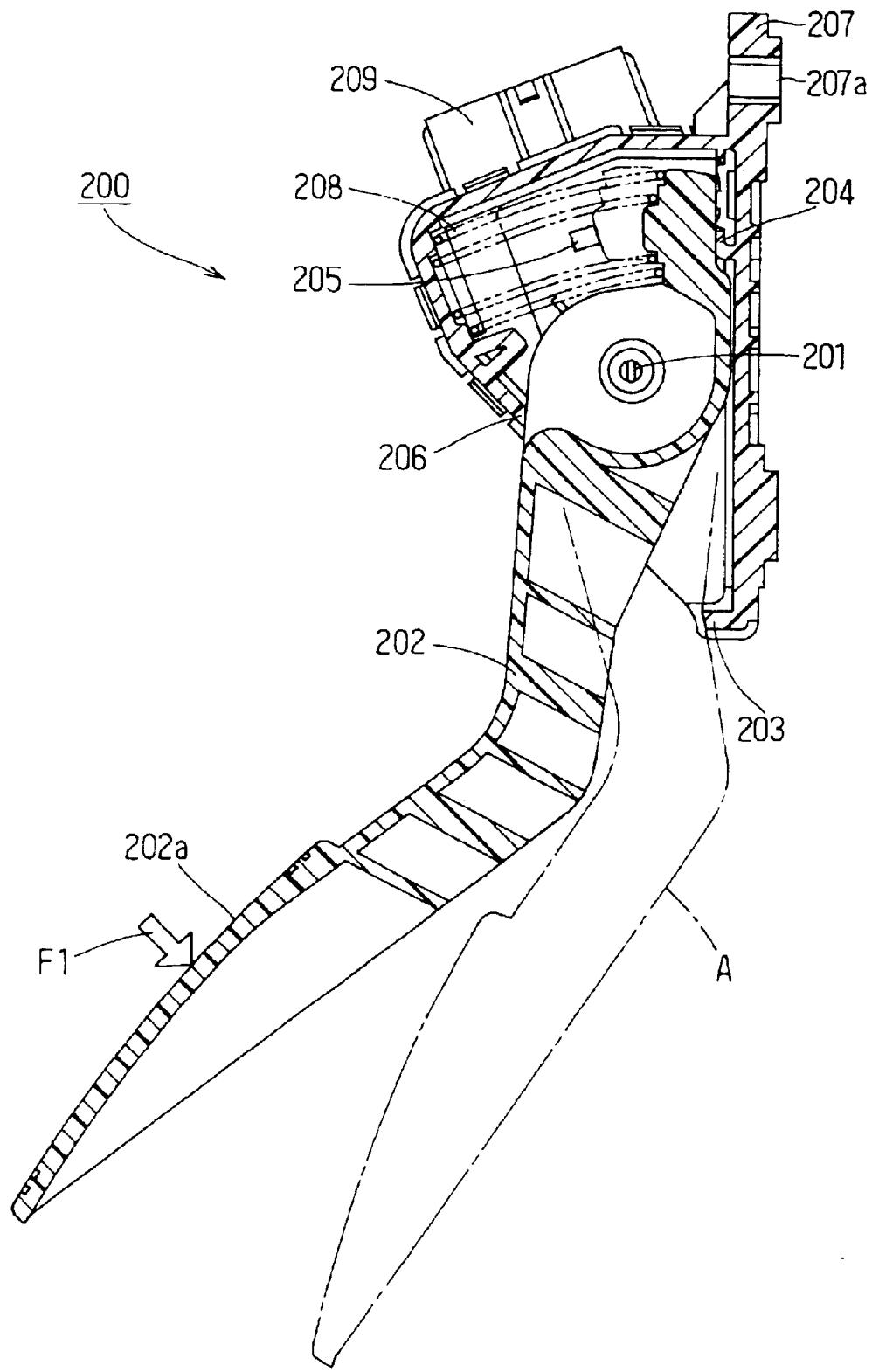
FIG. 6 is a cross sectional view of an accelerator pedal apparatus according to a second embodiment of the present invention.

With reference to FIG. 6, an accelerator pedal apparatus 200 according to the embodiment includes an accelerator pedal 202, a couple of fully opened position stop members 203, 205 and a couple of fully closed position stop members 204, 206. The accelerator pedal 202 is rotated about a rotational shaft 201 by a pedal pressing force (F1 in FIG. 6) applied to a pressing portion 202a of the accelerator pedal 202 from an operator. The fully opened position stop members 203, 205 stop the rotation of the accelerator pedal 202 by engaging with corresponding portions of the accelerator pedal 202 when the accelerator pedal 202 reaches a fully opened position. The fully closed position stop members 204, 206 stop the rotation of the accelerator pedal 202 by engaging with corresponding portions of the accelerator pedal 202 when the accelerator pedal 202 reaches a fully closed position. The fully opened position stop members 203, 205 are arranged on opposite axial sides of the accelerator pedal 202 about the rotational shaft 201. In other words, the fully opened position stop member 203 is arranged on a first side of the rotational shaft 201, and the fully opened position stop member 205 is arranged on a second side of the rotational shaft 201, which is opposite to the first side. Similarly, the fully closed position stop members 204, 206 are arranged on the opposite axial sides of the accelerator pedal 202 about the rotational shaft 201. In other words, the fully closed position stop member 206 is arranged on the first side of the rotational shaft 201, and the fully closed position stop member 204 is arranged on the second side of the rotational shaft 201.

The accelerator pedal apparatus 200 also includes a housing member 207, which is secured to a predetermined position of a vehicle and supports the rotational shaft 201, the fully opened position stop members 203, 205 and the fully closed position stop members 204, 206. The housing member 207 includes receiving holes 207a for receiving screws to secure the housing member 207 to the predetermined position of the vehicle. An accelerator pedal position sensor 209 is secured to the housing member 207 and outputs an electrical signal indicating an operational position of the accelerator pedal 202. A spring 208 is received in the housing member 207. The spring 208 acts as a return force applying means for generating return force to return the accelerator pedal 202 toward the fully closed position after the accelerator pedal 202 is pressed.

Figure 7B:
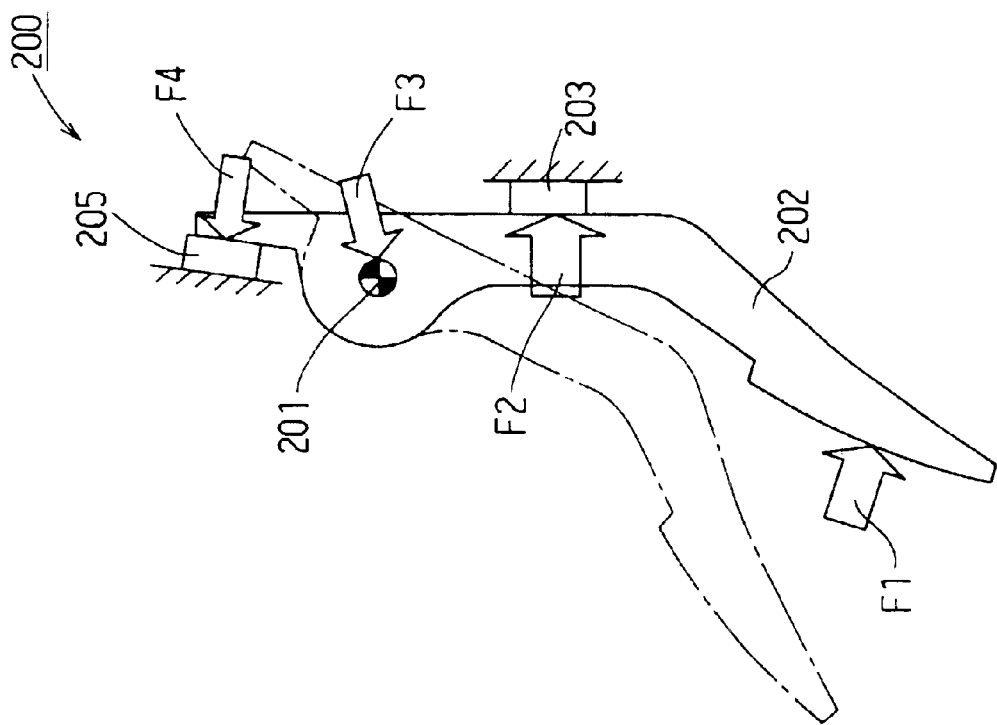
FIG. 7B is a schematic view showing a fully opened position of the accelerator pedal of the accelerator pedal apparatus of the second embodiment.
Figure 7A:
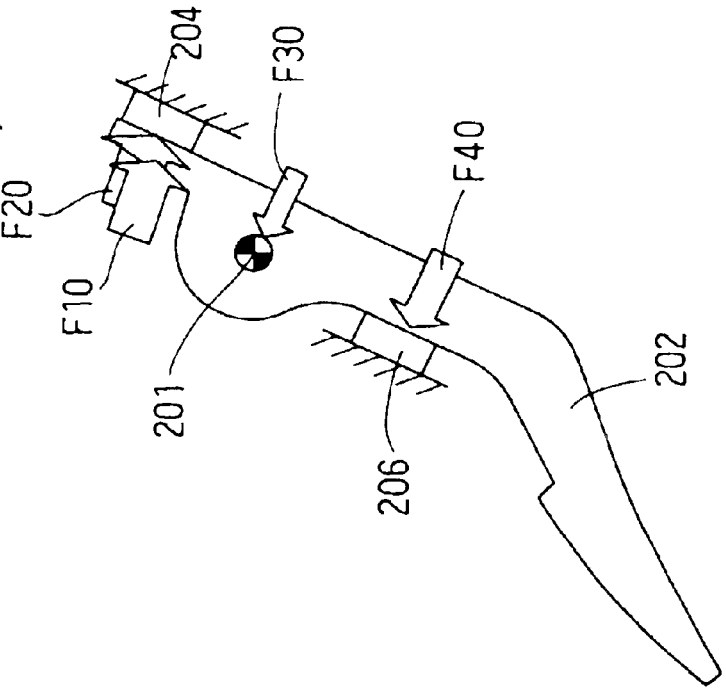
FIG. 7A is a schematic view showing a fully closed position of an accelerator pedal of the accelerator pedal apparatus of the second embodiment.

Even when the relatively large load is applied to the accelerator pedal 202, the corresponding load applied to the rotational shaft 201 can be reduced according to the present embodiment. FIG. 7A shows the fully closed position of the accelerator pedal 202. FIG. 7B shows the fully opened position of the accelerator pedal 202.

With reference to FIG. 7B, when the accelerator pedal 202 is positioned to the fully opened position by the pedal pressing force F1 applied from the operator, the corresponding portions of the accelerator pedal 202 are engaged with the fully opened position stop members 203, 205 to apply loads F2, F4 to the fully opened position stop members 203, 205. When the loads F2, F4 are applied to the fully opened position stop members 203, 205, a load F3 is applied to the rotational shaft 201. Applied directions and magnitudes of the loads F1, F2, F3, F4 are balanced to keep the accelerator pedal 202 at the fully opened position.

The balance of the forces (loads) F1, F2, F3, F4 will be described in connection with the principle of leverage. The point, to which the load F1 is applied when the accelerator pedal 202 is pressed, acts as a point of effort. The point, to which the load F2 is applied when the fully opened position stop member 203 is engaged with the corresponding portion of the accelerator pedal 202, acts as a fulcrum. The point of the rotational shaft 201, to which the load F3 is applied, acts as a first load point. The point, at which the load F4 is applied when the fully opened position stop member 205 is engaged with the corresponding portion of the accelerator pedal 202, acts as a second load point. In this embodiment, the load applied to the rotational shaft 201 is divided between and supported by the first load point and the second load point.

Specifically, the load F13 applied to the rotational shaft 101 of the previously proposed accelerator pedal 100 shown in FIG. 8B is divided between the load F3 applied to the rotational shaft 201 and the load F4 applied to the fully opened position stop member 205 of the accelerator pedal apparatus 200 shown in the FIG. 7B. Thus, in this embodiment, the load F3 applied to the rotational shaft 201 is advantageously reduced. As a result, there is provided the accelerator pedal apparatus 200, which can reduce the load F3 applied to the rotational shaft 201 even when the relatively large pedal pressing force F1 is applied to the accelerator pedal 202 from the operator. Although it is not depicted in the drawings, more than one fully opened position stop member 203, 205 can be provided on each axial side of the accelerator pedal 202 to further reduce the load applied to the fully opened position stop members and the rotational shaft 201.

When the pedal pressing force F1 applied from the operator to the accelerator pedal 202 is removed, the spring 208 returns the accelerator pedal 202 toward the fully closed position by the return force F10 generated by the spring 208 that urges the corresponding portion of the accelerator pedal 202. At this time, the corresponding portions of the accelerator pedal 202 are engaged with the fully closed position stop members 204, 206, and thus loads F20, F40 are applied to the fully closed position stop members 204, 206. When the loads F20, F40 are generated, a load F30 is applied to the rotational shaft 201. Applied directions and magnitudes of the loads F10, F20, F30, F40 are balanced to keep the accelerator pedal 202 at the fully closed position.

The balance of the forces (loads) F10, F20, F30, F40 will be described in connection with the principle of leverage.

The point, to which the load F10 is applied when the accelerator pedal 202 is released by the operator, acts as a point of effort. The point, to which the load F20 is applied when the fully closed position stop member 204 is engaged with the corresponding portion of the accelerator pedal 202, acts as a fulcrum. The point of the rotational shaft 201, to which the load F30 is applied, acts as a first load point. The point, at which the load F40 is applied when the fully closed position stop member 206 is engaged with the corresponding portion of the accelerator pedal 202, acts as a second load point. In this embodiment, the load applied to the rotational shaft 201 is divided between and supported by the first load point and the second load point. Specifically, the load F130 applied to the rotational shaft 101 of the previously proposed accelerator pedal apparatus 100 shown in FIG. 8A is divided between the load F30 applied to the rotational shaft 201 and the load F40 applied to the fully closed position stop member 206 of the accelerator pedal apparatus 200 of the present embodiment shown in the FIG. 7B. Thus, in this embodiment, the load F30 applied to the rotational shaft 201 is advantageously reduced. As a result, there is provided the accelerator pedal apparatus 200, which can reduce the load applied to the rotational shaft 201 even when the relatively large return force F10 is applied to the accelerator pedal 202 from the spring 208. Although it is not depicted in the drawings, more than one fully closed position stop member 204, 206 can be provided on each axial side of the accelerator pedal 202 to further reduce the load applied to the fully closed position stop members and the rotational shaft 201.

The accelerator pedal apparatus 200 is of a linkless throttle type, in which the accelerator pedal position sensor 209 is arranged to cooperate with the rotational shaft 201. In the linkless throttle type accelerator pedal apparatus 200, when the rotational shaft 201 is deformed, a measured signal indicating the operational position of the accelerator pedal becomes erroneous. However, the fully opened position stop members 203, 205 and the fully closed position stop members 204, 206 in the accelerator pedal apparatus 200 of the present invention reduce the loads applied to the rotational shaft 201 to restrain the deformation of the rotational shaft 201. That is, the stable measured signal of the accelerator pedal position sensor 209 can be provided.

It should be noted that when the fully opened position stop members 203, 205 and the fully closed position stop members 204, 206 are provided in an accelerator pedal apparatus having no accelerator pedal position sensor 209, deformation of a rotational shaft of the accelerator pedal apparatus can be advantageously restrained.

Additional advantages and modifications will readily occur to those skilled in the art. The invention in its broader terms is therefore, not limited to the specific details, representative apparatus, and illustrative examples shown and described.

What is claimed is:

1. A method for adjusting an output value of an accelerator pedal position sensor, the method comprising:
    positioning an accelerator pedal at a predetermined operational position, which is located between an application initiation position, at which application of resistive force from a resilient engaging member to the accelerator pedal is initiated, and an application end position, at which the resistive force from the resilient engaging member is substantially removed from the accelerator pedal;
    measuring an output value of a measurement device of the accelerator pedal position sensor while the accelerator pedal is positioned at the predetermined operational position to obtain the measured output value indicating the predetermined operational position of the accelerator pedal;

storing the measured output value of the measurement device of the accelerator pedal position sensor measured at the predetermined operational position of the accelerator pedal in a correction output value storage of the accelerator pedal position sensor along with a corresponding correction value, which is used to correct the measured output value of the measurement device of the accelerator pedal position sensor to obtain a corresponding preset output value of the accelerator pedal position sensor that is preassigned to the predetermined operational position of the accelerator pedal; and outputting the corresponding preset output value of the accelerator pedal position sensor, which is preassigned to the predetermined operational position of the accelerator pedal, from the accelerator pedal position sensor based on the corresponding correction value stored in the correction output value storage when the measurement device of the accelerator pedal position sensor outputs the corresponding measured output value associated with the correction value of the accelerator pedal position sensor.

2. A method according to claim 1, wherein the corresponding correction value is one of:

the corresponding preset output value of the accelerator pedal position sensor, which is preassigned to the predetermined operational position of the accelerator pedal;

a corresponding preset coefficient value, from which the corresponding preset output value of the accelerator pedal position sensor is obtainable by applying the corresponding preset coefficient value to the measured output value of the measurement device of the accelerator pedal position sensor; and a difference between the corresponding preset output value of the accelerator pedal position sensor and the corresponding measured output value of the measurement device of the accelerator pedal position sensor.

3. A method according to claim 1, wherein the positioning of the accelerator pedal to the predetermined operational position includes:

positioning the accelerator pedal at a reference position located between the application initiation position and a peak position, at which the resistive force applied from the resilient engaging member to the accelerator pedal shows a maximum value; and moving the accelerator pedal from the reference position to the predetermined operational position by moving the accelerator pedal by a predetermined angular distance.

4. A method according to claim 3, wherein the positioning of the accelerator pedal at the reference position includes:

measuring a pedal pressing force applied to the accelerator pedal; and moving the accelerator pedal until a measured pedal pressing force applied to the accelerator pedal reaches a predetermined pedal pressing force, which is measured at the reference position.

5. A method according to claim 3, wherein:

a free end of the resilient engaging member is in engagement with a support member, which rotatably supports the accelerator pedal and holds the other end of the resilient engaging member, when the accelerator pedal is positioned to the reference position; and the free end of the resilient engaging member is disengaged from the support member when the accelerator pedal is moved beyond the peak position toward the predetermined operational position.

6. A method according to claim 1, wherein the predetermined operational position of the accelerator pedal is a kickdown position of the accelerator pedal.

7. A method according to claim 1, wherein the storing of the measured output value of the measurement device of the accelerator pedal position sensor measured at the predetermined operational position of the accelerator pedal includes:

storing the measured output value of the measurement device of the accelerator pedal position sensor and the corresponding correction value in a predetermined output value storage before the measured output value of the measurement device of the accelerator pedal position sensor and the corresponding correction value is stored in the correction output value storage of the accelerator pedal position sensor;

retrieving the measured output value of the measurement device of the accelerator pedal position sensor and the corresponding correction value from the predetermined output value storage; and storing the measured output value of the measurement device of the accelerator pedal position sensor and the corresponding correction value, which are retrieved from the predetermined output value storage, in the correction output value storage.

8. A method according to claim 7, wherein the predetermined output value storage is provided separately from the accelerator pedal position sensor.

9. A method according to claim 1, wherein the measurement device of the accelerator pedal position sensor includes one of a Hall element type measurement mechanism, a magnetoresistive element type measurement mechanism and a differential transformer type measurement mechanism.

* * * * *